United States Patent [19]

Weingarten

[11] Patent Number: 4,662,598

[45] Date of Patent: * May 5, 1987

[54] SLEEVE VALVE WITH INTEGRAL CONTROL CHAMBER

[75] Inventor: Zvi Weingarten, Kibbutz Evron, Israel

[73] Assignee: Bermad Kibbutz Evron, Evron, Israel

[ * ] Notice: The portion of the term of this patent subsequent to Jan. 29, 2002 has been disclaimed.

[21] Appl. No.: 687,826

[22] Filed: Dec. 31, 1984

Related U.S. Application Data

[63] Continuation of Ser. No. 446,183, Dec. 2, 1982, Pat. No. 4,496,132, which is a continuation of Ser. No. 296,919, Aug. 27, 1981, abandoned.

[51] Int. Cl.$^4$ ............................................. F16K 31/385
[52] U.S. Cl. ....................................... 251/5; 251/61.1
[58] Field of Search ........................... 251/61, 5, 61.1; 137/843, 846, 853, 850; 222/504, 544; 239/537, 546

[56] References Cited

U.S. PATENT DOCUMENTS

| 279,451 | 6/1883 | Sinclair | 137/846 |
| 3,685,538 | 8/1972 | Sullivan | 251/5 |
| 3,690,344 | 9/1972 | Brumm | 251/5 |
| 3,936,028 | 2/1976 | Norton et al. | 251/5 |
| 4,494,345 | 1/1985 | Peterson | 251/5 |
| 4,496,132 | 1/1985 | Weingarten | 251/5 |

FOREIGN PATENT DOCUMENTS

| 1177886 | 9/1964 | Fed. Rep. of Germany | 137/853 |
| 1200083 | 8/1965 | Fed. Rep. of Germany | 251/172 |
| 689229 | 3/1953 | United Kingdom | 251/5 |
| 525824 | 12/1976 | U.S.S.R. | 251/5 |

Primary Examiner—Carroll B. Dority, Jr.
Assistant Examiner—H. A. Odar
Attorney, Agent, or Firm—Silverman, Cass, Singer & Winburn, Ltd.

[57] ABSTRACT

A sleeve valve comprising an elastomer sleeve folded onto itself, the two peripheral ends being fixedly held so that an integral control chamber is created, an opening being provided in said chamber for connecting it to a control pressure source, no housing being required.

5 Claims, 7 Drawing Figures

SLEEVE VALVE WITH INTEGRAL CONTROL CHAMBER

This application is a continuation of application Ser. No. 446,183 filed Dec. 2, 1982, now U.S. Pat. No. 4,496,132, which is a continuation of application Ser. No. 296,919 filed Aug. 27, 1981, now abandoned.

The present invention concerns a sleeve valve with integral control chamber.

Sleeve valves are known, comprising an elastomer sleeve generally mounted in a housing, the sleeve being surrounded by a pressure chamber to keep it in closed or pinched condition.

It is the object of the present invention to provide a sleeve valve wherein the sleeve has an integral control chamber so that the housing for the valve can be eliminated.

It is a further object of the invention to provide a sleeve valve which owing to its construction is cheap, is efficient in operation and assures a long service life without requiring maintenance or replacement.

The invention consists in a sleeve valve comprising an elastomer sleeve folded onto itself, the two peripheral ends being fixedly held so that an integral control chamber is created, an opening being provided in said chamber for connecting it to a control pressure source.

The part of said sleeve which, when it is folded, comes to lie on the inside is constructed to have the characteristics of a conventional sleeve valve, while the part which comes to be on the outside constitutes a retaining wall, so that the housing can be eliminated.

The invention is illustrated, by way of example only, in the accompanying drawings in which.

Figure 1:
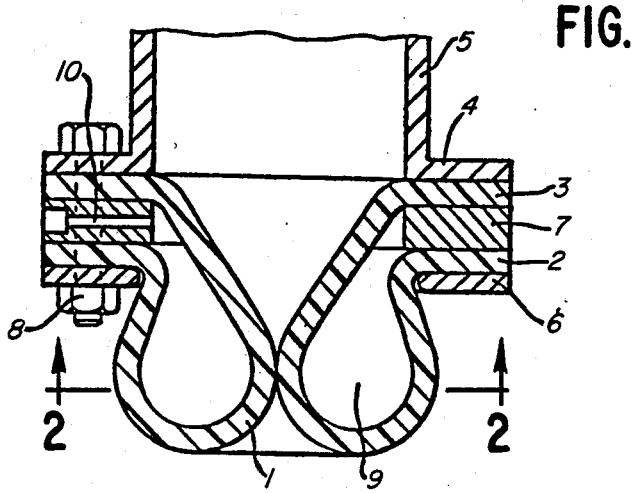
FIG. 1 is a longitudinal section through a sleeve valve with integral control chamber according to the invention installed at the end of a pipe line.

The sleeve valve according to the invention comprises an elastomer sleeve 1 which is folded onto itself, its two peripheral edges 2 and 3 being held between a flange 4 at the end of a pipe line 5 and an annular retaining ring 6. A second annular ring 7 is inserted between ends 2 and 3, the entire assembly being fastened to flange 4 by means of bolts and nuts 8.

It can be seen from FIG. 1 that when sleeve 1 is folded into itself and its ends are retained, a peripheral chamber 9 is formed which becomes the control chamber of the sleeve valve in that an opening 10 is provided in ring 7, said opening being connected to a control pressure source (not shown). The part 11 of the sleeve which comes to lie on the inside has the characteristics of a conventional sleeve valve, which when in the closed condition forms with its diametrically opposed side a tight closure. The part 12 thereof which lies on the outside constitutes the retaining wall for the sleeve valve. Thus the housing for this valve can be eliminated, making this type of valve extremely inexpensive to manufacture.

Figure 3:
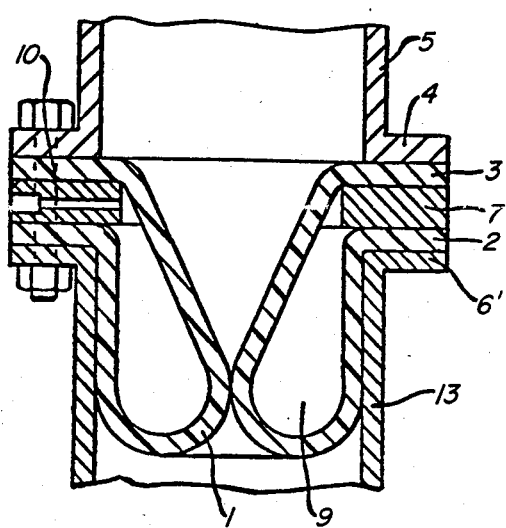
FIG. 3 is a view similar to that of FIG. 1 of a valve according to the invention installed within a pipe line.

The valve of FIG. 3 is similar to that of FIG. 1 and the same parts have been designated with the same reference numerals, except that ring 6 here is constituted by a flange 6' of a pipe 13 illustrating how a valve according to the invention can be inserted into a pipe line.

Figure 2:
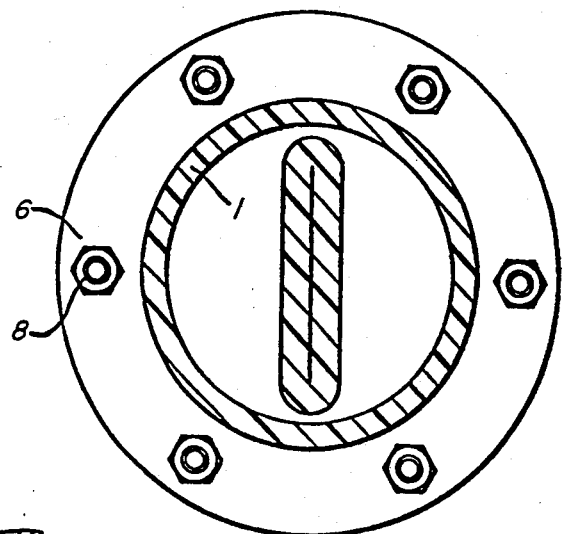
FIG. 2 is a section thereof taken on line II—II of FIG. 1.
Figure 4:
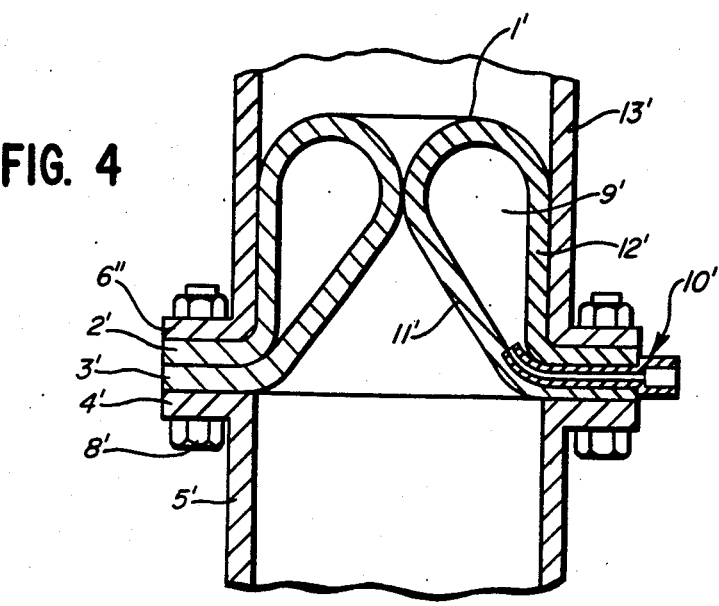
FIG. 4 is a longitudinal section through a modified sleeve valve with intergral control chamber according to the invention installed within a pipe line, and illustrating the ends of the sleeve clamped together in direct engagement.
Figure 6:
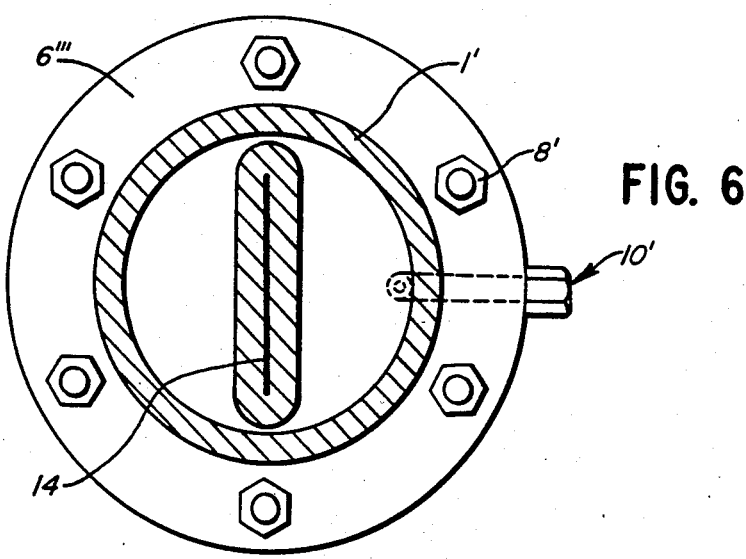
FIG. 6 is a sectional view taken along the line 6—6 of FIG. 5 and in the indicated direction.
Figure 5:
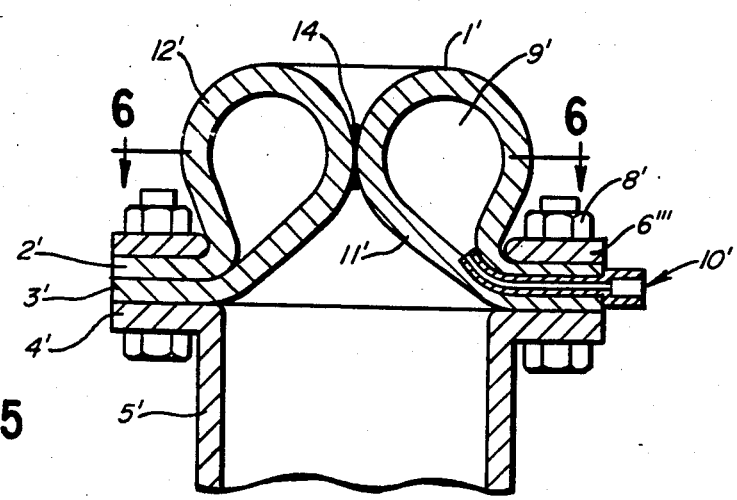
FIG. 5 is a sectional view of the valve of FIG. 4 installed at the end of a pipe line.
Figure 7:
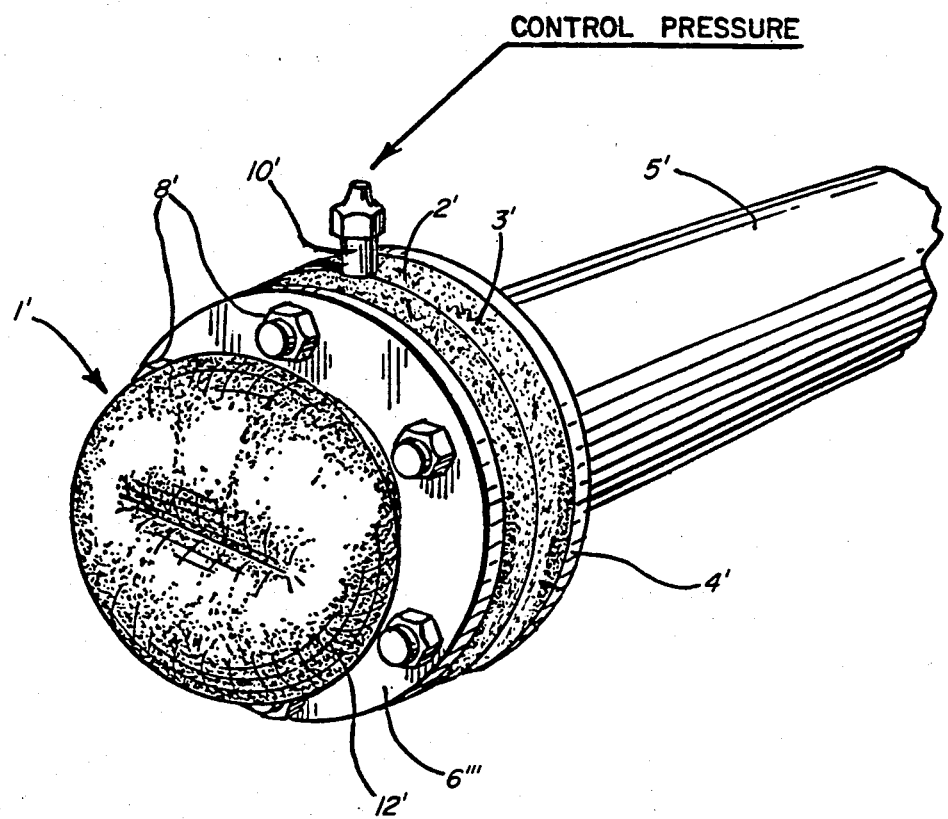
FIG. 7 is a perspective view of the exterior of the sleeve valve installed at the end of a pipe as illustrated in section in FIG. 5.

If desired, ring 7 can be eliminated and the opening to the control pressure source can be made in the sleeve itself at any convenient position, as illustrated in the modified embodiment of the sleeve valve of the invention shown in FIGS. 4 to 7. The embodiments shown in FIGS. 4 to 7 have structual elements corresponding to similar elements in the embodiments of the sleeve valve illustrated in FIGS. 1 to 3 and these elements have been designated with the same but primed reference numerals. As illustrated in FIG. 4, the ends 2' and 3' of the folded sleeve 1' are clamped in direct engagement between the flanges 4' and 6". In FIGS. 5 to 7, the ends 2' and 3' are clamped in direct engagement between the flange 4' and ring 6'. Furthermore, the part "11" of the sleeve 1 may be provided with an integral projecting bead 14 to enhance the contact surface of the closure as illustrated in FIGS. 4 and 5.

I claim:

1. A sleeve valve comprising a generally circular elastomer sleeve folded onto itself to define an annulus, said sleeve having two peripheral ends, said ends being fixedly held in at least partial sealed engagement so that an integral control chamber is created within said annulus, means providing an opening in said chamber for connecting said chamber to a control pressure source, and an inner wall of the annulus including portions adapted to close together when said chamber is pressurized to seal the valve, said portions closing together at a position including a plane axially spaced downstream from any position between said peripheral ends.

2. A sleeve valve as claimed in claim 1 wherein said inner wall portions are provided with an integral projection bead.

3. A sleeve valve as claimed in claim 1, wherein said ends are oriented coaxial with the longitudinal central axis through said annulus.

4. A sleeve valve as claimed in claim 1 wherein said ends are removably clamped in said engagement by clamping means.

5. A sleeve valve as claimed in claim 4 wherein said clamping means comprises a pair of flange members.

* * * * *